United States Patent [19]

Lee

[11] 4,207,290
[45] Jun. 10, 1980

[54] FLUE GAS SCRUBBER

[75] Inventor: Terry J. Lee, Easton, Pa.

[73] Assignee: Pfizer Inc., New York, N.Y.

[21] Appl. No.: 860,710

[22] Filed: Dec. 15, 1977

Related U.S. Application Data

[63] Continuation-in-part of Ser. No. 782,760, Mar. 30, 1977, and a continuation-in-part of Ser. No. 621,052, Oct. 9, 1975, abandoned.

[51] Int. Cl.² .......................... B01J 2/12; B01J 8/10
[52] U.S. Cl. .................................. 422/109; 34/137; 55/247; 422/111; 422/169; 422/178; 422/210; 423/242; 432/118
[58] Field of Search ............... 23/262, 286; 432/118; 34/137, 9; 55/247; 423/210 R, 242 R, 242 A, 243, 244; 422/169, 177, 178, 209, 210

[56] References Cited

U.S. PATENT DOCUMENTS

| | | | |
|---|---|---|---|
| 1,857,785 | 5/1932 | Holzapfel | 432/118 X |
| 2,039,645 | 5/1936 | Hechenbleikner | 34/137 |
| 2,314,836 | 3/1943 | Seil | 432/118 X |
| 2,553,464 | 5/1951 | McNeill | 432/118 X |
| 3,333,837 | 8/1967 | Bojner | 432/118 |
| 3,395,905 | 8/1968 | Isheim et al. | 34/137 |
| 3,785,119 | 1/1974 | McIlvaine | 55/7 |
| 3,839,803 | 10/1974 | Dick | 34/9 X |
| 3,853,458 | 12/1974 | Wurr et al. | 432/118 |
| 3,871,829 | 3/1975 | Keith et al. | 34/137 X |
| 3,896,556 | 7/1975 | Welter | 34/9 |
| 3,910,756 | 10/1975 | Henning | 432/118 |
| 4,060,587 | 11/1977 | Lewis | 423/210 |

*Primary Examiner*—Arnold Turk
*Attorney, Agent, or Firm*—Connolly and Hutz

[57] ABSTRACT

A flue gas scrubber for removing sulfur dioxide from hot flue gas includes a scrubbing section within which wet lime or limestone slurry is tumbled through the flue gas and a drying section incorporating agitating and nodulizing portions. A chain assembly and lifting scoops in the scrubbing section tumble the wet lime or limestone slurry in intimate contact with the flue gas to react with and remove the sulfur dioxide from the gas and form a slurry reaction product. A demisting zone in the scrubbing section assists in the removal of particulate matter. An annular baffle or dam separates the scrubbing and drying sections, and the agitating portion of the drying section from the final nodulizing portion. Low dams help impede rapid passage of the slurry through the scrubber. The hot flue gas flowing through the drying section removes most of the moisture from the drying slurry reaction product to lower its free moisture content from about 50 to 80 percent by weight in the scrubbing pool to about 5 to 25 percent by weight on discharge from the drying section. The dried slurry product comprises mechanically stable pellets which are highly suitable for use as landfill.

23 Claims, 8 Drawing Figures

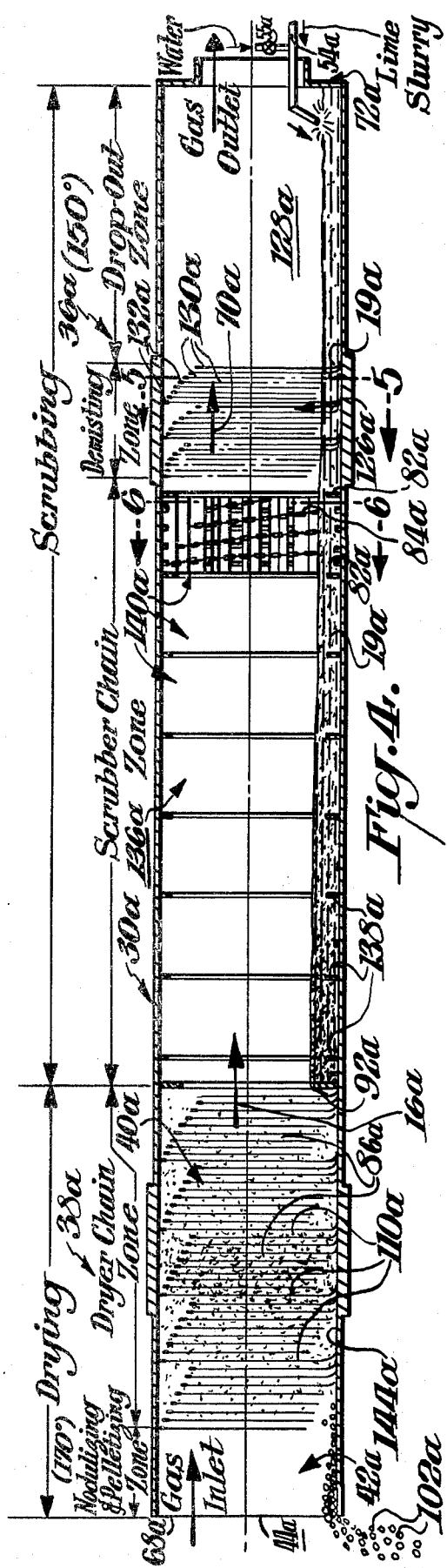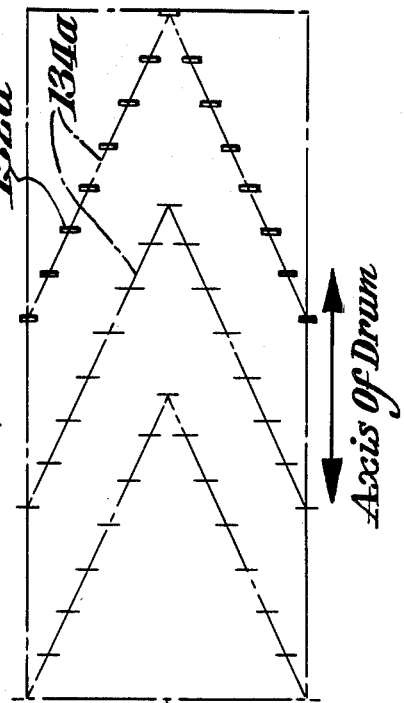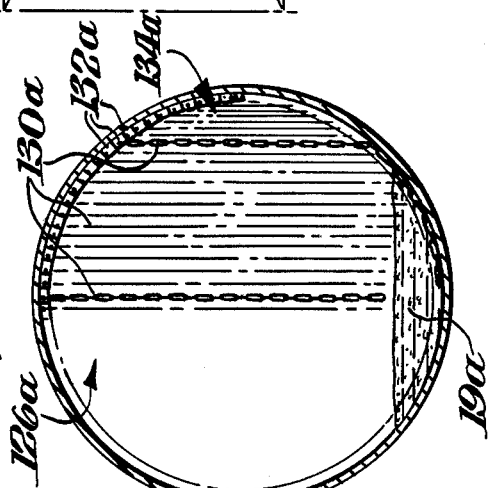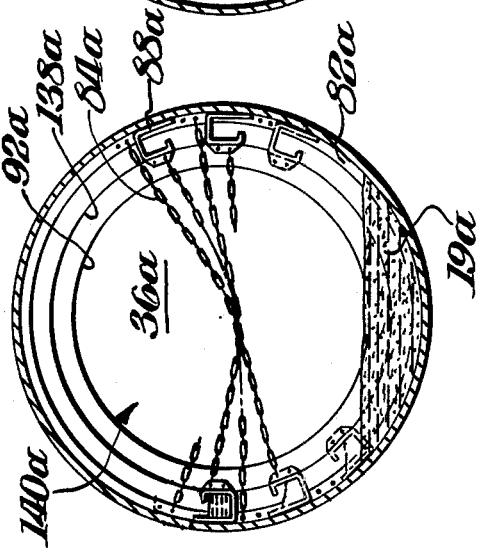

FLUE GAS SCRUBBER

CROSS REFERENCE TO RELATED APPLICATIONS

This application is a continuation-in-part of commonly assigned U.S. patent applications Ser. No. 621,052, filed Oct. 9, 1975 now abandoned and Ser. No. 782,760, filed Mar. 30, 1977 by the same inventors.

BACKGROUND OF THE INVENTION

A tubular rotating scrubber for removing sulfur dioxide from stack gases by tumbling contact of a lime slurry was invented by Clifford J. Lewis and constitutes the subject of U.S. Pat. No. 4,060,587. Such apparatus and its method of operation are also described in the following publications and various oral presentations of similar context:

(1) Lewis, C. J., "New Concept for Scrubbing Gases," Brick and Clay Record, June, 1973;

(2) Lewis, C. J., "Lime, Limestone Employed in New Gas Scrubbing Concept," Pit and Quarry, July, 1973;

(3) Lewis, C. J., "Aqueous Lime Scrubber Simplifies Sulfur Dioxide Removal," Rock Products, July, 1974.

The Lewis system effectively removes sulfur dioxide from a flue gas, but the waste sludge product normally contains from about 50 to 80 percent by weight of free moisture. This sludge poses a waste solids disposal problem because of its semisolid nature and substantial quantity. An object of this invention is to provide a scrubber for removing sulfur dioxide from flue gas which minimizes the amount of free moisture in the waste product. A further object is to provide a process for such sulfur dioxide removal which also furnishes a slurry product which is suitable for use as landfill.

SUMMARY

In accordance with this invention, a flue gas scrubber for treating a gas with a slurry to react with and remove components therefrom comprises an elongated tubular drum which rotates about its longitudinal axis and includes a drying section disposed after a scrubbing section in the direction of movement of the slurry. A relatively high dam separates the scrubbing and drying sections. Tumbling means, such as a chain assembly and lifting scoops, are disposed in the scrubbing section to provide intimate contact between the slurry and the gas. A demisting assembly helps remove particulates from the flue gas as it passes out of the scrubbing section. The drying section may advantageously include chains which impact against and remove caked drying slurry reaction product from the walls of the drum, and a final nodulizing section which is free of obstruction. The drum may be advantageously sloped slightly downward from the scrubbing end to the drying end to cause the slurry to flow through it. The drying section is long enough to cause the hot flue gas introduced into its solids-discharging end to substantially reduce the free liquid or moisture content of the slurry reaction product and highly facilitate its ultimate disposal. Preferably, the free moisture content of the slurry reaction product is reduced from about 50 to 80 percent by weight in the scrubbing pool to about 5 to 25 percent, especially about 5 to 15 percent, by weight at discharge from the drying end of the drum. The agitating and substantially smooth nodulizing portions of the drying section may advantageously be separated by an annular baffle or dam. An advantageous example of this invention has a drum which is about 75 to 100 feet long with a diameter of about 10 to 15 feet. The scrubbing section and the drying section preferably occupy approximately equal lengths of the drum. The drying section in tandem with the scrubbing section unexpectedly provides a multitude of functional advantages including: more efficient utilization of the slurry; cooling of the flue gas, which increases the components' solubility in the slurry and reduces the volume of flue gas to be treated; minimized dewatering of the pool of slurry in the scrubbing section; development of a very tacky mass of drying slurry in the drying section, which helps remove particulates from the flue gas in the drying section; and formation of a slurry reaction product which, at the exit from the drying section, is mechanically stable and useful as landfill.

BRIEF DESCRIPTION OF THE DRAWINGS

Novel features and advantages of the present invention will become apparent to one skilled in the art from a reading of the following detailed description in conjunction with the accompanying drawings wherein similar reference characters refer to similar parts and in which:

FIG. 4 is another diagrammatic side view in elevation in cross section of another scrubber installation, which constitutes another embodiment of this invention;

FIG. 5 is a cross-sectional view taken through FIG. 4 along the line 5—5;

FIG. 6 is another cross-sectional view taken through FIG. 4 along the line 6—6;

FIG. 7 is a diagrammatic view of the manner in which the connected ends of the chains in the demisting and dryer chain zones shown in FIG. 4 are arranged; and FIG. 8 is a 3-dimensional view of one of the agglomerated pellets discharged from the scrubber apparatus shown in FIGS. 1 and 4.

DESCRIPTION OF THE PREFERRED EMBODIMENTS

Figure 1:
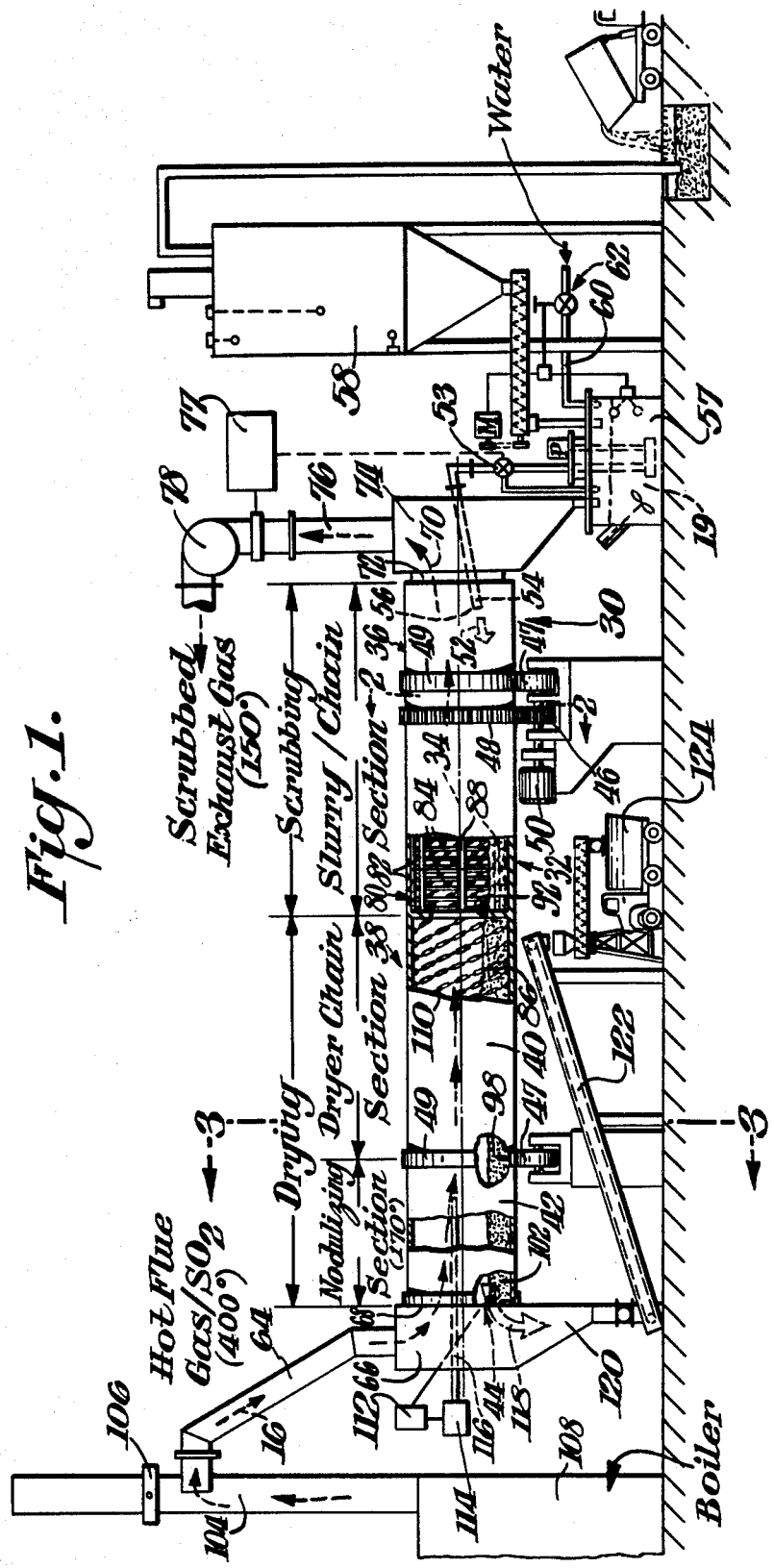
FIG. 1 is a diagrammatic side view in elevation partially in cross section of a scrubber installation which incorporates one embodiment of this invention.

In FIG. 1 is shown flue gas scrubber system 30 incorporating an elongated tubular drum 32 mounted to rotate about a slightly inclined longitudinal axis 34. The inclination is, for example ⅛ inch per foot. Tubular drum 32 is about 88 feet long with an internal diameter of about 11 feet. The scrubbing section 36 is about 40 feet long and a drying section 38 comprises the remainder of drum 32. The drying section 38 includes an agitating portion 40 and a substantially smooth nodulizing portion 42 adjacent the exit 44. Drum 32 is rotated by pinion gear 46 engaged by bull gear 48 mounted to the outside of the drum 32. Electric motor 50 connected to pinion gear 46 supplies the rotating force. The drum 32 is rotatably supported or cradled in sets of tires 47 mounted to engage spaced rims 49. Although two such tire and rim support systems are shown in FIG. 1, more such support systems could be used depending on the length of drum to be supported and rotated.

Lime or limestone slurry 19 is introduced in the direction of arrow 52 through supply pipe 54 into entrance 56 of scrubbing section 36. Slurry 19 is prepared in a mixing tank 57 into which lime or limestone is fed from storage tower 58 and water is introduced through piping 60 in amounts regulated by automatic control valve 62. Flue gases designated by arrow 16 are introduced through inlet duct 64 and bonnet 66 into the end 68 of drying section 38 and flow through drum 32. The treated gases 70 flow out of the end 72 of scrubbing section 36 and through bonnet 74, outlet duct 76 and fan 78 to exhaust to atmosphere. Sulfur dioxide gas sampler and control unit 77 is connected to exhaust gas duct 76. This unit controls the sulfur dioxide content in the treated gas 70 that is escaping into the atmosphere by increasing or decreasing the amount of slurry volume through regulation of slurry flow control valve 53 mounted in slurry supply line 54.

Figure 2:
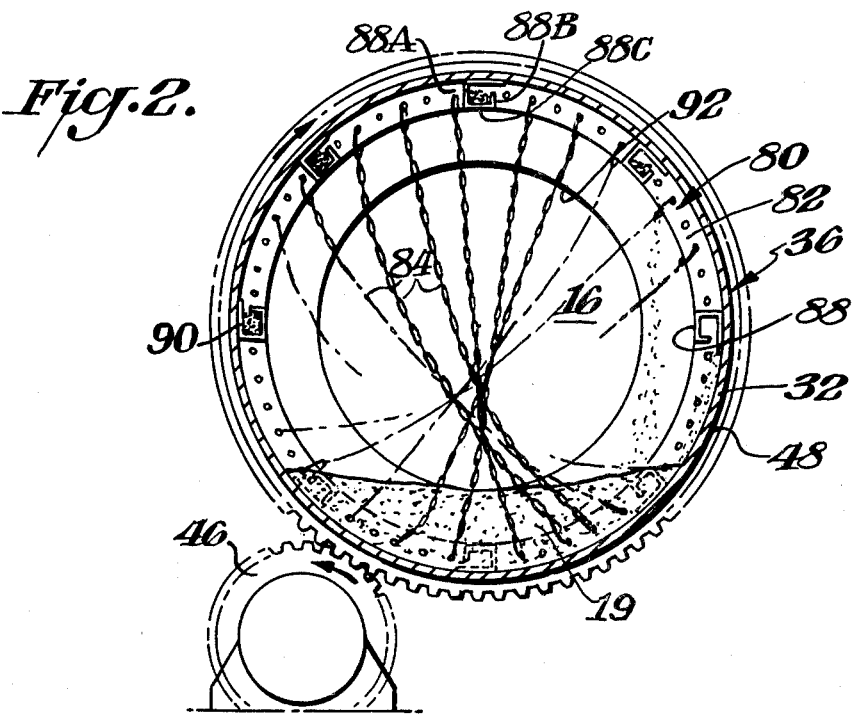
FIG. 2 is a cross-sectional view taken through FIG. 1 along the line 2—2.

Scrubbing section 36 includes tumbling means 80 including a cage 82 to which chain assembly 84 is connected. Cage 82 is removably inserted within scrubbing section 36 to facilitate cleaning. Chain assembly 84 is connected to cage 82 for tumbling and agitating slurry 19 into intimate contact with flue gas 16 to remove the sulfur dioxide from it and to form slurry reaction product 86, which passes through drying section 38 as later described. Cage 82 includes longitudinal ribs which are formed as scoops 88, as shown in FIG. 2, which disperse and distribute slurry 19 throughout the interior of the scrubbing section 36 during rotation. Scoops 88 and chain assembly 84 tumble lime slurry 19 within the flow of flue gas 16 to intimately mix and react them with each other to scrub and substantially remove sulfur dioxide components from flue gas 16 before it flows out of end 72 of scrubbing section 36 in the form of treated or scrubbed gas 70 which is exhausted to the atmosphere.

As shown in FIG. 2, scoops 88 have a longer radial section 88A connected to arm 90 attaching them to cage 82, a base 88C and a shorter radial section 88B providing a lip which retains a portion of the slurry 19 within scoop 88 until the final portion of its upper travel as shown by the retention and discharge of portions of slurry 19 in the various scoops 88. The scoops 88, therefore, carry slurry 19 from the bottom of the drum 32 and release it across the interior of the drum 32 as the scoops 88 are carried to upper portions of the drum 32 by its rotation. FIG. 2 also shows how lips 88B provide restricted outlets on scoops 88 for gradually releasing the contents thereof through a large portion of travel of scoops 88 across the upper portion of the drum 32, whereby thorough intermixing of the slurry 19 dropped from scoops 88 through the flue gas 19 is promoted across all portions of the interior of the drum 32.

The scrubber system 30 reduces the sulfur dioxide content, for example, from about 2000–4000 ppm in flue gas 16 to about 500 ppm or less in treated gas 70.

Scrubbing section 36 is separated from drying section 38 by annular dam 92 which ensures that a substantial height of slurry 19 is retained within scrubbing section 36.

Drying section 38 includes an agitating portion 40 and a substantially smooth or nodulizing portion 42 separated from each other by another annular dam 98. The nodulizing portion 42 retains slurry reaction product 86 within drying section 38 for a sufficient time to be nodulized and to be dried by flue gas 16, which flows through the entire length of drum 32. Hot flue gases 16 are removed from stack 104 by inlet duct 64 connected below transverse sealing baffle 106. Stack 104 is, for example, the flue for boiler 108 and conducts a flow of flue gases 16 having a substantial sulfur dioxide content when coal or fuel oil of high sulfur content is burned in boiler 108.

Figure 3:
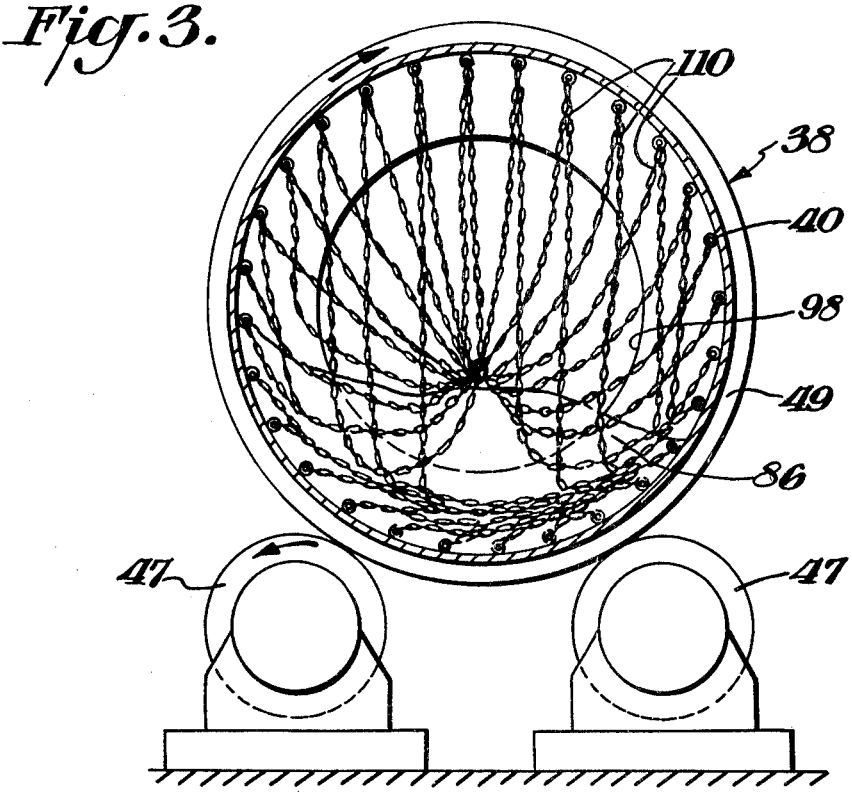
FIG. 3 is another cross-sectional view taken through FIG. 1 along the line 3—3.

An anchored agitating chain assembly 110 is mounted in agitating portion 40 of drying section 38. Agitation chain 110 is of an inclined configuration and is connected, for example, as shown in FIGS. 1 and 3 to help agitate wet slurry reaction product 86 throughout the flow of hot flue gas 16 to help lower the free moisture content of slurry reaction product 86 before it flows out of exit 44 of drying section 38. The chain assembly 110 keeps scale from building up on the inside of drum 32 by its constant innerwall contact. In addition, the chains 110 are used as supplemental heat conductors to the slurry reaction product 86 since they will conduct the heat from the flue gas 16. Slurry reaction product 86 has a free moisture content of from about 50 to 80 percent by weight as it passes from scrubbing section 36 to drying section 38. The hot flue gases 16 introduced through duct 64 are at about 400° F. and contain about 10 volume percent water or less. The gases 16, being unsaturated with respect to water, thus remarkably reduce the free moisture content of slurry reaction product 86 passing through drying section 38. The water transfer to the flue gas 16 as it passes through drying section 38 in turn remarkably reduces the temperature of the flue gas 16 and essentially saturates it with water before it reaches scrubbing section 36. Dewatering of slurry 19 with the consequent problem of scaling in scrubbing section 36 is therefore effectively minimized. Treated flue gas 70 leaves scrubber 30 at about 150° F.

Temperature sensor 112 disposed within drying section 38 is connected through control system 114 to spray pipe 116 in nodulizing portion 42 to maintain dried slurry reaction product 102 at a temperature of about 170° F. and a free moisture content of about 5 to 25 percent by weight, especially 5 to 15 percent by weight, as it is discharged in the direction of arrow 118 into collecting hopper 120. Dried slurry reaction product 102 is removed through collecting and discharging system 122 and transported away from the scrubbing system 30 by truck 124.

A controlled variable in the drying section 38 is the free moisture content of the discharged solids 102. The desired free moisture content is estimated to be between about 5 and 25 percent by weight. A free moisture content of less than 5 percent by weight tends to create fugitive dusting in the solids handling systems. A moisture content much in excess of 25 percent by weight causes the solids to be excessively fluid in addition to increasing the amount of solids for disposal.

The free moisture content of the discharged solids 102 may be controlled by an empirical correlation between the moisture content and the solids temperature. Solids temperature at the point 44 at which solids leave the drying section 38 is monitored by an infrared temperature sensor 112. An output signal from this sensor controls the addition of water to the drying section 38 via a spray pipe 116. Thus, once the entire scrubber system 30 has been started, a solids discharge temperature corresponding to the desired free moisture content is selected, and this moisture content is then maintained by the automatically controlled addition of water to the drying section 38. The moisture content may also be maintained by controlling the free moisture content in the scrubbing section 36.

The flue gas scrubber as described herein, because of its method of operation in which hot flue gas is continuously contacted with a countercurrent stream of lime slurry in contiguous scrubbing and drying zones, is remarkably efficient, not only for removing the sulfur dioxide from the flue gas but also from the standpoint of energy conservation. The sulfur dioxide is effectively removed in a scrubbing zone by the lime slurry and the slurry reaction product sludge which is formed is simultaneously dewatered in the drying zone, downstream of the scrubbing zone in the direction of flow of the lime slurry, upon contact with the incoming hot flue gas. The flue gas enters the drying zone at from about 350° to 550° F. and leaves the scrubbing zone at from about 120° to 180° F. Fly ash present in the incoming hot flue gas is also removed, in the drying as well as the scrubbing zone, and discharged in the dewatered sludge, which leaves the drying zone at from about 100° to 200° F. Thus a readily disposable slurry reaction product, suitably with a free moisture content of about 5 to 25 percent by weight, is obtained with no additional energy consumption.

This slurry reaction product is also readily adaptable for use as landfill. A prior process for producing landfill from scrubber sludge is described in a brochure entitled "Poz-O-Tec$^R$" distributed by IU Conversion Systems, Inc., Philadelphia, Pa. As described in that brochure, the Poz-O-Tec system treats hot flue gas, after electrostatic precipitation of its fly ash content, in a sulphur dioxide scrubber, and the resultant sludge is then dewatered by thickening and filtration steps and recombined with the separated fly ash and other additives in the production of wet stabilized material suitable for landfill. In the process of the present invention, such a landfill product can be produced in a single step. The sulfur dioxide and fly ash are effectively removed from flue gas in the novel process of the present invention and the sludge which forms is simultaneously dewatered in the drying zone thereof. This process affords the ability to discharge solid slurry reaction product in the form of mechanically stable pellets of suitable moisture content, for example, from about 5 to 25 percent by weight as already set forth hereinbefore. Such solid pellets or nodules are eminently suitable for use as landfill. Other substances such as boiler bottom ash may be incorporated in the slurry reaction product if desired for the use as landfill.

The aforementioned fly ash is present in appreciable amounts in flue gas obtained from the burning of soft coal. Flue gas obtained from oil-fired boilers may also contain components which lead to the formation of such pellets or agglomerates with sufficient physical strength and integrity, free from an appreciable amount of fine dust or other troublesome powders, to be a useful and conveniently handled landfill material. There might not be any silicates in the form of fly ash in the flue gas from oil-fired boilers, however; in such case, it may be necessary to add silicates to the reaction product if fly ash is absolutely necessary to make the ultimate product in the form of pellets.

In FIGS. 4-8 is shown a modified flue gas scrubber system 30a, which is similar to that described in FIGS. 1-3 with the exception of features described hereinafter.

The scrubbing section 36a includes a demisting zone 126a and a dropout zone 128a in addition to the scrubber chain zone 136a.

Demisting zone 126a incorporates a series of chains 130a which are, for example, hung at the upper ends 132a in the chevron pattern 134a as shown in FIGS. 5 and 7. Chains 130a are of the same length and extend at different distances into scrubber pool 19a as shown in FIG. 5. The demisting zone 126a performs the function of removing particulates from scrubbed gas 70a before it passes through dropout zone 128a and discharges from scrubbing section 36a.

Scrubber chain zone 136a incorporates seven sections 140a having cross sections shown in FIG. 6, which are similar to FIG. 2 with the exception that the ends of scrubber chains 84a extend between inner portions of scoops 88a on cage 82a.

Scrubbing pool 19a maintains a substantially uniform free moisture content from the free end 72a of scrubbing section 36a to relatively high dam 92a, which separates scrubbing section 36a from drying section 38a. This moisture content is approximately 50 to 80 percent by weight. Such free moisture content is maintained by introducing water to scrubbing pool 19a as required through valve 55a. A series of relatively lower retarding dams 138a prevent slurry from running too quickly through the length of slurry pool 19a.

Dryer chain zone 40a of drying section 38a incorporates a number of dryer chain sections 110a similar in pattern to that shown in FIG. 7. The drying slurry reaction product 86a resulting from contact of slurry pool 19a and the flue gases 16a tends to form a buildup on the walls 144a of dryer chain zone 40a. As a result, the walls 144a are covered with varying thicknesses of drying slurry reaction product 86a, with slightly lesser thicknesses at the extremities, and a heavier buildup generally toward the central portion, of dryer chain zone 40a. Such buildup is knocked off by dryer chain section 110a to form a pelletized agglomerated reaction product 102a in nodulizing and pelletizing zone 42a which is discharged from the free exit end 44a of drying section 38a. Dried reaction product pellets 102a, which generally are from about one-quarter to two inches in diameter and contain from about 5 to 25 weight percent free moisture, are illustrated in FIG. 8. Such pellets form a highly advantageous landfill product discussed herein.

The raw material used in the slurry in scrubbing pool 19a is an alkaline substance which reacts with sulfur dioxide and/or other components in the flue gas 16a. The prevalent material used is lime, which forms calcium salts when combined with the sulfur dioxide in the flue gas from burning coal. Other common scrubbing materials such as dolomite and limestone may also be used. The principal problem in sulfur dioxide separators utilizing lime is the formation of scale comprising these calcium salts. The present invention has the unexpected advantage of removing such scale in the drying section 38a by knocking it off with swinging chains 110a to ultimately form small agglomerated pellets 102a which have substantial physical strength and integrity. It is possible that carbon dioxide present in the flue gas 16a might also contribute to the hardness of the pellets 102a.

As discussed hereinbefore, the scrubbing section 36a is divided from the drying section 38a by a relatively high dam 92a, the water content of the slurry 19a contained by the high dam 92a being substantially uniform throughout the scrubbing section 36a. The series of smaller dams 138a within the scrubbing section 36a prevent the slurry 19a from rapidly flowing through this section, but the principal slurry retainer is the high dam 92a. A sufficient amount of water is fed to the slurry in the scrubbing section 36a, through valve 55a if needed, to maintain the required percentage moisture content thereof. This amount is preferably just enough to give the slurry 19a sufficient fluidity to flow over the dam 92a into the drying section 38a. If desired, valve 55a may be automatically controlled by a heat sensor, not shown, at flue gas inlet 68a for measuring the heat introduced by the flue gas 16a. Also if desired, special additives capable of lowering the slurry viscosity may be incorporated into the slurry 19a to permit the use of a minimal amount of water to attain this fluidity. The recited water content is probably sufficient for practical purposes without requiring such additives, however.

The slurry 19a starts to show significant loss of its water content as soon as it flows over the dam 92a into the drying section 38a. The drying slurry reaction product 86a becomes tacky, and probably helps remove fly ash or other particulate matter from the flue gas because of this sticky nature.

One of the unexpected advantages of this invention is that the particles of dried slurry reaction product are agglomerated into pellets or small stones with an absence of excess powder, the presence of which would be undesirable. Those skilled in the art would not have realized that the ultimate product would be small pellets or stones and not a troublesome powder. Other unexpected advantages of this invention include the following:

A. There is more efficient utilization of lime. Considerable excess lime is employed in slurry scrubbers to protect the metal parts from corrosion. The continued sulfur dioxide removal which occurs in the tandem drying section of the present scrubber significantly reduces this excess without transferring the corrosion problem to the drying section.

B. The solubility of sulfur dioxide in the scrubbing slurry is increased by the cooling of the flue gas before it enters the scrubbing section.

C. The volume of flue gas is decreased by the cooling of the gas in the tandem drying section, thereby providing a higher scrubber capacity.

D. Dewatering and scaling in the scrubbing section are minimized.

E. A significant amount of fly ash is probably removed in the drying section.

F. The drying is accomplished without separate apparatus and additional heat input.

I claim:

1. A flue gas scrubber for treating a flue gas with a slurry to remove components therefrom, comprising an elongated tubular drum having a longitudinal axis and a pair of ends, rotating means mounting the tubular drum to revolve the drum about its longitudinal axis, the tubular drum having a scrubbing section and a drying section at opposite ends separated by a slurry-retaining dam, a gas inlet disposed at the drying end for introducing a flow of previously-combusted flue gas from a stack into the tubular drum for longitudinal flow through it from the drying to the scrubbing end, a slurry-feeding means on the tubular drum for introducing a flow of aqueous slurry into the tubular drum for longitudinal flow through it from the scrubbing to the drying end, the dam and slurry-feeding means maintaining a pool of slurry in the scrubbing section having a free moisture content ranging from about 50 to 80 percent by weight to facilitate the removal of gas components and replenishing the flow of slurry through the pool, tumbling means in the scrubbing section for intimately mixing the slurry with the gas to cause the slurry to combine with components of the gas and form a reaction product, a gas-collecting and-removing means connected to the scrubbing end for collecting and removing the gas which passes through the tubular drum, the drying section being long enough to expose the reaction product travelling through it to the heat of the flue gas for reducing the free moisture content of the reaction product to about 5 to 25 percent by weight, whereby the flue gas is cooled before it flows into the scrubbing section, its solubility in the slurry is increased, its volume is reduced, the removal of the gas component by the slurry is prolonged and increased and formation of a physically strong agglomerated dry reaction product is promoted, and discharge means disposed at the drying end of the tubular drum for conducting the substantially dry reaction product from the scrubber.

2. A flue gas scrubber as set forth in claim 1 wherein heat-sensing means is provided at the gas inlet to measure the rate of heat input in the entering flue gas and water feed means responsive to the heat-sensing means is provided in the scrubbing section to control the free moisture content of the slurry pool at about 50 to 80 percent by weight.

3. A flue gas scrubber as set forth in claim 1, wherein a liquid-spraying means and a temperature-sensing means are disposed within the end of the drying section, together with control means connecting the temperature-sensing means with the liquid-spraying means for controlling the moisture content of the discharged slurry reaction product.

4. A flue gas scrubber as set forth in claim 1, wherein the slurry-feeding means is a mixing tank and feeding system for feeding an aqueous lime-containing slurry to the scrubbing section, and the gas inlet is heat-resistant ductwork for introducing hot flue gas having a sulfur dioxide content to the end of the drying section.

5. A flue gas scrubber as set forth in claim 4, wherein sulfur dioxide-sensing means is provided at the gas-collecting and -removing means and slurry feed control means responsive to the sulfur dioxide-sensing means is provided at the slurry-feeding means to maintain the sulfur dioxide content of the exit gas below a predetermined limit.

6. A flue gas scrubber as set forth in claim 1, wherein the longitudinal axis of the tubular drum slopes slightly downwardly from the scrubbing to the drying end to cause the slurry and slurry reaction product to flow through the tubular drum.

7. A flue gas scrubber as set forth in claim 6, wherein the drying section and gas inlet are of sufficient capacities to discharge the slurry reaction product with a moisture content of about 5 to 15 percent by weight.

8. A flue gas scrubber as set forth in claim 1, wherein the drying section includes an impacting agitating chain portion disposed adjacent the scrubbing section and a substantially smooth portion disposed adjacent the discharge end.

9. A flue gas scrubber as set forth in claim 8, wherein an annular dam is disposed between the impacting agitating chain and substantially smooth portions.

10. A flue gas scrubber as set forth in claim 1, wherein the tumbling means includes scoops attached to the inside of the tubular drum for carrying slurry from the bottom of the drum and releasing it across the interior of the drum when the scoops are carried to upper portions of the drum by its rotation, the scoops having restricted outlets for evenly releasing the contents thereof through a large portion of the travel of the scoops across upper portions of the drum whereby thorough intermixing of the slurry dropped from the scoops through the gas is promoted throughout all portions of the cross-sectional interior of the drum.

11. A flue gas scrubber as set forth in claim 10, wherein the scoops have a longer radial section attaching them to the drum and a shorter radial section providing a lip which retains a portion of the slurry within the scoop until the final portion of the upper travel.

12. A flue gas scrubber as set forth in claim 1, wherein a demisting zone is disposed in the scrubbing section between the tumbling means and the scrubbing end of the tubular drum.

13. A flue gas scrubber as set forth in claim 12, wherein a dropout zone is disposed between the demisting zone and the scrubbing end of the tubular drum.

14. A flue gas scrubber for treating hot flue gas with reactive slurry to remove components from the flue gas, comprising an elongated tubular drum having opposed ends and a longitudinal axis and being disposed for rotation about such axis, means for rotating the drum, slurry overflow dam means interposed in the drum at a selective axial point intermediate such ends to divide the interior of the drum into a scrubbing section and a drying section and to maintain a pool of slurry in the scrubbing section, gas inlet means disposed for introducing hot flue gas into the end at the drying section for flow through the drum to the end at the scrubbing section, gas recovery means disposed for collecting and removing the gas from the scrubbing section end after flowing through the drum, slurry flow feeding means disposed for introducing a selective flow of gas component-removing aqueous slurry into the scrubbing section end for flow through the drum to the drying section end, tumbling means in the scrubbing section for intimately mixing the aqueous slurry with a flue gas to cause the slurry to combine with components of the gas and form a reaction product, water inlet means in the scrubbing section for maintaining the free moisture content of the slurry pool in the scrubbing section at from about 50 to 80 percent by weight, the length of the drying section being sufficient to reduce the free moisture content of the slurry reaction product to from about 5 to 25 percent by weight during travel along the extent of the drying section in contact with the hot flue gas, thereby promoting formation of a physically strong agglomerated substantially dry reaction product while cooling the flue gas and reducing its volume before flowing into the scrubbing section and thereby increasing its solubility in the slurry and promoting gas component removal by the slurry, and solids discharge means disposed at the drying end for conducting the substantially dry reaction product from the drum.

15. A flue gas scrubber as set forth in claim 14, wherein the interior of the drum adjacent the drying section end is provided as a substantially uniform and unobstructed cross sectional flow path having a substantially smooth interior wall surface for shaping the reaction product into pellets during drum rotation under controlled moisture conditions prior to discharge.

16. A process for removing sulfur dioxide from flue gas containing it, comprising the steps of contacting the flue gas with a tumbling countercurrent stream of alkali-containing aqueous slurry in a rotary drum which rotates about a longitudinal axis, forming a pool of the aqueous slurry in a scrubbing zone in the rotary drum, maintaining the free moisture content in the pool at from about 50 to 80 percent by weight, passing the slurry through a drying zone in the rotary drum in which the free moisture content of the reaction product of the aqueous slurry by contact with flue gas is reduced to about 5 to 25 percent by weight, whereby the flue gas is cooled before flowing into the scrubbing zone, its solubility in the slurry is increased, its volume is reduced, the removal of the gas component by the slurry in the rotary drum is prolonged and increased and a physically strong agglomerated dry reaction product is formed, breaking up and removing the reaction product as relatively strong pellets by directing forceful impacts against the reaction product and discharging the pellets from the drying zone.

17. A process as set forth in claim 16, wherein the flue gas enters the drying zone at about 350° to 550° F. and exits from the scrubbing zone at about 120° to 180° F.

18. A process as set forth in claim 16, wherein the reaction product exits from the drying zone at a temperature of from about 100° to 200° F.

19. A process as set forth in claim 16, wherein the flue gas enters the drying zone with a sulfur dioxide content of from about 2000 to 4000 ppm and leaves the scrubbing zone with a sulfur dioxide content of about 500 ppm or less.

20. A process as set forth in claim 16, wherein the free moisture content of the product as it exits from the drying zone is about 5 to 15 percent by weight.

21. A process as set forth in claim 16, wherein the flue gas is demisted before it flows out of the rotary drum.

22. A process for treating hot flue gas with reactive slurry in a substantially horizontally extending rotating drum to remove components from the flue gas, comprising contacting the hot flue gas in countercurrent flow with reactive aqueous slurry to form a reaction product of such components in the gas with the slurry and thereby remove such components from the gas, by passing the flue gas in a first flow through a reaction product drying section in the rotating drum and then through a flue gas scrubbing section in the rotating drum while passing the slurry in a second flow through the scrubbing section for scrubbing contact with the flue gas to form such reaction product and in turn passing the slurry reaction product from the scrubbing section through the drying section for heating contact with the hot flue gas to dry the slurry reaction product, maintaining the slurry in the scrubbing section in the form of a pool having a free moisture content of from about 50 to 80 percent by weight in the lower portion of the rotating drum and bringing portions of the pool contents into intimate mixing contact with the gas flowing thereabove through the scrubbing section for facilitating the removal of such components from the gas, reducing the moisture content of the reaction product in the drying section to from about 5 to 25 percent by weight by contact with the hot flue gas while correspondingly cooling the flue gas and reducing its volume prior to its flow through the scrubbing section to increase its solubility in the slurry so as to promote such gas component removal by the slurry, forming the drying reaction product passing through the drying section into pellets, and discharging the substantially dry pellets from the drying section at a moisture content of from about 5 to 25 percent by weight.

23. A process as set forth in claim 22, wherein the gas components include sulfur dioxide and the reactive slurry is aqueous lime slurry, and wherein the lime reaction product passing through the drying section is formed into physically strong pellets.

* * * * *

UNITED STATES PATENT AND TRADEMARK OFFICE
CERTIFICATE OF CORRECTION

PATENT NO. : 4,207,290
DATED : June 10, 1980
INVENTOR(S) : TERRY J. LEE

It is certified that error appears in the above-identified patent and that said Letters Patent are hereby corrected as shown below:

Title page [19] - after "Lee" add -- et al --.

Title page [75] - after "Terry J. Lee, Easton, Pa." add --, Herbert W. Flandreau, Jr., Westport, Conn., and Wayne E. McCoy, Easton, Pa. --.

Title page [63] line 2 - after "1977," insert -- abandoned,--

Column 1, line 9 - after "inventors" insert -- , now abandoned --.

Column 7, line 49 - change "I" to -- We --.

Claim 14, column 9 - line 37 - change "a" to -- the --.

Signed and Sealed this

Twenty-fifth Day of November 1980

[SEAL]

Attest:

SIDNEY A. DIAMOND

*Attesting Officer*  *Commissioner of Patents and Trademarks*